United States Patent [19]

Paul et al.

[11] Patent Number: 4,855,341
[45] Date of Patent: Aug. 8, 1989

[54] HIGH-STRENGTH MAGNESIUM ALUMINOSILICATE GLASS FIBERS HAVING SIZE COATING OF EPOXY RESIN WITH METHACRYLOXYALKYL AND AMINOALKYL SILANES

[75] Inventors: F. Ronald Paul, Heath; Richard M. Haines, Warsaw; Homer G. Hill, Mt. Vernon, all of Ohio

[73] Assignee: Owens-Corning Fiberglas Corporation, Toledo, Ohio

[21] Appl. No.: 77,062

[22] Filed: Jul. 23, 1987

Related U.S. Application Data

[63] Continuation of Ser. No. 714,605, Mar. 21, 1985, abandoned, which is a continuation of Ser. No. 536,101, Sep. 26, 1983, abandoned.

[51] Int. Cl.$^4$ .................. C08L 63/00; C08K 3/40; D02G 3/00
[52] U.S. Cl. ...................... 523/443; 428/378; 428/391; 428/392; 523/444; 523/456; 523/527; 524/494; 65/3.41; 65/3.44
[58] Field of Search .............. 428/375, 391, 392, 378; 65/3.41, 3.43, 3.44; 523/443, 444, 456; 524/494

[56] References Cited

U.S. PATENT DOCUMENTS

| | | | |
|---|---|---|---|
| 3,402,055 | 9/1968 | Harris et al. | 524/492 X |
| 3,473,950 | 10/1969 | Wong | 428/391 X |
| 3,920,313 | 11/1975 | Wong et al. | 428/375 X |
| 4,246,145 | 1/1981 | Molinier | 523/443 X |
| 4,346,026 | 8/1982 | Wong et al. | 524/157 |
| 4,394,418 | 7/1983 | Temple | 523/443 X |
| 4,394,475 | 7/1983 | Temple et al. | 524/262 |
| 4,500,600 | 2/1985 | Wong et al. | 428/391 |

OTHER PUBLICATIONS

"The Manufacturing Technology of Continuous Glass Fibers", 1983, K. L. Loewenstein, pp. viii, ix, 33–39.

*Primary Examiner*—Lorraine T. Kendell
*Attorney, Agent, or Firm*—Patrick P. Pacella; Robert F. Rywalski

[57] ABSTRACT

High-strength magnesium aluminosilicate glass fibers coated with the dried residue of a dilute aqueous sizing composition containing emulsified epoxy resin or emulsified epoxy resin solution, both 3-methacryloxypropyltrimethoxysilane and 3-aminopropyltriethoxysilane, and at least one lubricant, are compatible as reinforcing elements with unsaturated polyester, vinylester and epoxy resin matrixes.

14 Claims, No Drawings

HIGH-STRENGTH MAGNESIUM ALUMINOSILICATE GLASS FIBERS HAVING SIZE COATING OF EPOXY RESIN WITH METHACRYLOXYALKYL AND AMINOALKYL SILANES

CROSS REFERENCE TO RELATED APPLICATION

This application is a continuation of U.S. Ser. No. 714,605 filed Mar. 21, 1985 which is a continuation of Ser. No. 536,101, filed on Sept. 26, 1983, both of which are abandoned.

FIELD OF THE INVENTION

This invention relates to the field of glass fibers and more particularly to size coated glass fibers to be imbedded as reinforcing elements in resinous matrix materials.

BACKGROUND OF THE INVENTION

Glass fibers destined for use as reinforcing elements in resinous materials ordinarily have a sizing composition, typically containing a polymeric or resinous film-forming component, a glass-resin coupling agent such as an organosilane, and such other components as lubricants, antistatic agents, etc., in dilute solution or dispersion in a volatile liquid solution, applied during their manufacture, preferably before they are gathered together in multi-filament strands. The amount of sizing composition so applied is adapted to result in the deposit of a very light-weight size coating on the glass fibers after any losses of liquid sizing composition from the fibers during processing and evaporation of volatile components from the liquid sizing composition remaining on the fibers, which may take place either before or after the fibers or multi-filament strands thereof are collected into a package as by winding into a rotating collet.

Sizing glass fibers is done for several purposes. Both before and after evaporation of volatile components, the sizing composition protects the glass fibers from being weakened as a result of abrasion during processing and handling. The sizing composition can also serve to help integrate the individual fibers of a multi-fiber strand into a more or less coherent unit. Finally, the dried size coating, while continuing to protect the fibers from mutual abrasion and to integrate multi-filament strands, can also facilitate the wetting of the coated fibers by a fluid material which will form a solid resinous matrix in which the fibers are imbedded as reinforcing elements and enhance the coupling between the cured resinous, matrix and the glass fibers so as to produce a more effectively reinforced composite material.

For applications in which higher tensile strength in the glass fiber reinforcing elements is desired, the fibers can advantageously be made from magnesium aluminosilicate glass compositions, such as described in U.S. Pat. No. 3,402,055 issued Sept. 17, 1968 to Harris and Machlan for Glass Composition and incorporated herein by reference. Heretofore, such fibers have been used primarily as reinforcing elements in epoxy resin matrixes but their use in such other resinous matrixes as polyesters, vinylesters, etc., is now becoming desirable.

The present invention provides improved sizings for such high-strength magnesium aluminosilicate glass fibers, and particularly sizings compatible with matrixes of such other resins as unsaturated polyesters, vinylesters, etc., as well as epoxides.

SUMMARY OF THE INVENTION

The invention is a bundle of high-strength magnesium aluminosilicate glass fibers wherein the component fibers have a size coating thereon consisting of the dried residue of a dilute aqueous sizing composition comprising: (a) an emulsified liquid epoxy resin or an emulsified liquid solution of a major proportion by weight of an epoxy resin and a minor proportion by weight of a solvent therefor; (b) 3-methacryloxypropyltrimethoxysilane and 3-aminopropyltriethoxysilane and/or hydrolysates thereof; and (c) at least one glass fiber lubricant.

DESCRIPTION OF PREFERRED EMBODIMENTS

The sizings of the invention are preferably applied to the glass fibers as those fibers are formed. (ordinarily by drawing a plurality of glass streams emerging from a body of molten magnesium aluminosilicate glass through orifices in a so-called bushing to attenuate those streams to the desired diameter before they solidify by cooling) as a dilute aqueous sizing composition containing the non-volatile components which will form the dried size coating thereon, and before the fibers have either been gathered together in multi-filament strands or been brought into mechanical contact with any portion of the production apparatus likely to cause damage by abrasion. Suitable means for such application of dilute aqueous sizing compositions are well known and include bringing the fibers into direct contact with rolls, bars, belts, aprons, pads, etc. wet with the sizing composition, as well as spraying, curtain coating, etc.

The epoxy resin component of the sizing composition should be liquid at ordinary ambient workplace temperatures or be dissolved with a minor proportion by weight of a plasticizing solvent therefor so that the solution is liquid at such temperatures. Suitable epoxy resins include predominantly linear diepoxide condensation reaction products of a bisphenol such as bisphenol A and an epihalohydrin such as epichlorohydrin. Such a condensate of bisphenol A and epichlorohydrin characterized by an average epoxy equivalent weight (EEW) from about 250 to about 400 is particularly suitable, preferably as a high solids solution (e.g. from about 80 to about 95% by weight epoxy resin) in a solvent such as diacetone alcohol. A suitable and preferred material is a 90% solution in diacetone alcohol of a linear diepoxide bisphenol A-epichlorohydrin condensate having a specified EEW of 265–365 and is available under the designation DER 337 DA 90 (TM/Dow Chemical Co.).

Any suitable surfactant(s) may be used to emulsify the epoxy resin or high solids solution thereof. Among the many suitable surfactants known for this purpose, predominantly non-ionic systems are preferred. Surfactants comprising a major proportion by weight of alkylarylpoly(alkoxy)alkanols, such as nonylphenoxypoly(ethoxy)ethanols, are particularly suitable. The amount of surfactant used can vary considerably, depending upon the particular epoxy material to be emulsified, the particular surfactants employed, the nature of the other components of the sizing composition, the particle diameter desired for the emulsified material, etc. Generally from about 5 to about 25 percent by weight relative to the amount of epoxy resin, or solution thereof, will be found satisfactory, with about 10 to about 20 percent being preferred. It will ordinarily be preferred to first emulsify the epoxy resin or solution in water and then mix that emulsion with the other size components to form the dilute aqueous sizing composition.

The sizings of the present invention employ a combination of 3-methacryloxypropyltrimethoxysilane and 3-aminopropyltriethoxysilane as glass-resin coupling agent. While both the total amount of silane and the relative proportions of each can be varied considerably, it is preferred that the total amount of silane be from about 20 to about 60 percent by weight of the total weight of all non-volatile components of the sizing, more preferably from about 30 to about 50 percent, and that the relative weight ratio of the methacryloxysilane to the amino silane be from about 50:50 to about 90:10, more preferably from about 60:40 to about 80:20, in order to achieve good compatability of the sized high-strength fibers with both unsaturated polyester and vinylester matrix resins, as well as with epoxy matrix resins. These silanes are subject to hydrolysis in aqueous medium, especially under acidic conditions and it may be found advantageous to promote such hydrolysis by pre-mixing one or both silanes with dilute aqueous acid, such as acetic acid.

Many suitable glass fiber lubricants are known. Among them, emulsified mineral oil has been found particulary suitable, but others can be used. The amount of lubricant is not critical, but from about 1 to about 10 percent by weight of the total non-volatile components of the sizing composition is preferred, and from about 2 to about 6 percent is particularly preferable.

Other compatible components, such as thickening or thixotropic agents, anti-static agents, etc. can also be incorporated in the sizing composition, if desired. Many suitable materials are known in the art. Polyvinylpyrrolidone is a particularly suitable thickening agent for the dilute aqueous sizing compositions of this invention.

The dilute liquid sizing composition can advantageously be applied to the glass fibers so as to deposit the non-volatile components thereof as a coalesced and dried size coating on the fibers over a fairly broad range of coating weights. However, adjusting the dilution and viscosity of the dilute liquid sizing composition, as well as selecting the type of application means and suitably adjusting the apparatus involved, so as to ultimately deposit on the glass fibers about 0.1 to about 2 percent by weight of the non-volatile size components, relative to the weight of the fibers, is advantageous, about 0.2 to about 1 percent is preferred, and about 0.4 to about 0.8 percent by weight is especially preferred. Generally, less will be found optimal with larger diameter individual fibers than with smaller.

The high-strength magnesium aluminosilicate glass fibers to which the sizing compositions are applied to produce the improved sized glass fibers of the invention are of well known composition and formed by conventional means. Their tensile strength is typically about 30% greater than that of ordinary glass fibers made from E-glass. While the individual glass fibers can be made in a wide range of diameters, it has sometimes been found advantageous in practice of the present invention to employ fibers of somewhat larger individual diameter than would ordinarily be selected in order to permit use of smaller proportions of sizing, relative to the weight of glass, since these size compositions are relatively expensive. For many uses a fiber diameter of about 13–14 microns (K-fibers) is found advantageous.

The sized glass fiber strands, or multi-strand rovings thereof, of the invention are principally useful as essentially continuous reinforcing elements in unsaturated polyesters, vinylester and epoxy matrixes produced by filament winding, pultrusion, etc., where high tensile strength in the reinforcing elements, together with good mechanical properties of the composite, is required. But they can also be used as short, chopped reinforcing elements in these and other resinous matrixes.

EXAMPLE 1

A concentrated emulsion of a liquid epoxy resin which was substantially a diglycidoxy-terminated reaction product of bisphenol A and epichlorohydrin having average epoxy equivalent weight of about 265 to about 355 and obtained as a 90% solution in diacetone alcohol designated DER 377 DA 90 (TM/Dow Chemical Co.) was first prepared as an intermediate for use in preparing dilute aqueous sizing compositions of the invention. The surfactants employed for emulsifying the epoxy resin were Igepal Co 897 (TM/GAF Corp.), a 70% solution in water of a nonylphenoxypoly(ethoxy)ethanol characterized by an HLB index of about 17.8, Igepal CO 210 (TM/GAF Corp.), a nonylphenoxypoly(ethoxy)ethanol characterized by an HLB index of about 4.6, and Methocel MC-15 (TM/Dow Chemical Co.), a methyl cellulose, all non-ionic surfactants.

The formulation of these components was as follows:

| Component | Wt. % |
|---|---|
| DER 337 DA 90 | 58.1 |
| Igepal CO 897 | 8.0 |
| Igepal CO 210 | 1.9 |
| Methocel MC-15 | 0.1 |
| D.I. Water | Balance |
| Total non-volatiles | 60 |

The epoxy resin solution with diacetone alcohol and the principal surfactants were heated to about 150° F. and blended together in a tank equipped with a Cowles high shear disperser. The Methocel was pre-mixed with about ¼ of the water, heated to about 150° F., and then slowly added to the other components while the mixture was subjected to high shear agitation and the temperature maintained approximately constant. During this addition, the initially formed water-in-oil emulsion inverted to an oil-in-water emulsion. Then the balance of the water was added slowly while high shear agitation was maintained. The product was a stable emulsion of about 60 percent by weight total non-volatiles and exhibited the characteristic bluish color of fine particle emulsions.

EXAMPLE 2

A preferred dilute aqueous sizing composition for use in producing the invention was made using the emulsion of epoxy resin solution of Example 1, A-174 TM/Union Carbide Corp.) 3-methacryloxypropyltrimethoxysilane, A-1100 (TM/Union Carbide Corp.) polyvinylpyrrolidone as 22.5% aqueous solution, and Emerlube 7440 (TM/Emery Industries), which is a mixture containing about 40% mineral oil, about 20% amide/ester lubricant/anti-static agent and about 20% surfactants in a ratio of about 3:1 non-ionic:anionic, according to the following formula:

| Component | Wt. % |
| --- | --- |
| Epoxy emulsion of Ex. 1 | 4.99 |
| A-174 | 1.50 |
| A-1100 | 0.62 |
| PVP K-90 | 0.42 |
| Emerlube 7440 | 0.32 |
| Acetic acid | 0.51 |
| D.M. Water | Balance |

The A-1100 was first mixed with a portion of the water and the epoxy emulsion was then added to this mixture thoroughly stirred in under moderate agitation. The A-174 was separately hydrolyzed by mixing with the acetic acid diluted in another portion of the water and continuing agitation of this pre-mix for about 20 to 30 minutes and then adding to the epoxy-A1100 mixture. The Emerlube 7440 and PVP K-90 were separately mixed together and then slowly diluted with a portion of the water sufficient to invent the initially formed water-in-oil emulsion before being added to the main mixture. The pH of the final mixture was about 4 to about 5 and the non-volatiles constituted about 4.8 to about 5.2 percent by weight. It was found desirable to store this dilute aqueous sizing composition under mild agitation for not longer than about 3 days before use.

EXAMPLE 3

The dilute aqueous sizing composition of Example 2 was applied to high-strength magnesium aluminosilicate glass fibers of U.S. Pat. No. 3,402,055 previously referred to and having average diameters of about 9–10 microns (G-fibers) and about 13–14 microns (K-fibers) as they were being produced, the individual wet fibers then being gathered into multi-filament strands yielding about 15,000 yards/lb. for the G-fibers and about 7,500 yards/lb. for the K-fibers, and the strands collected by winding, onto cylindrical cores into packages which were dried in a conventional air convection oven. The amount of the dilute aqueous, sizing composition applied to the individual fibers was controlled so as to ultimately deposit about 0.4 to about 0.8 percent by weight of dried size on the glass fibers. These strands were merged together in groups of 20 for the G-fiber strands and 10 for the K-fiber strands to form rovings suitable for embedding as reinforcing elements on resinous matrixes of unsaturated polyester, vinylester or epoxy resins.

The rovings of Example 3 were found to wet out efficiently with conventional unsaturated polyester, vinylester and epoxy resin compositions. The composite articles formed by curing these resinous matrix compositions, containing the embedded rovings of the invention exhibit excellent physical properties, including excellent tensile, flexural and shear strengths, and superior retention of shear strengths after extended immersion in boiling water. It is especially advantageous that such properties can be obtained in polyester, vinylester and epoxy resin matrixes with the same sized high-strength magnesium aluminosilicate glass fibers.

Numerous variations and modifications of the invention as particularly described herein will be apparent to those skilled in the art and these are contemplated as within the scope of the invention.

We claim:

1. A bundle of high-strength magnesium aluminosilicate glass fibers wherein the component fibers have a size coating thereon consisting of the dried residue of a dilute aqueous sizing composition consisting essentially of:
   (a) an emulsified liquid epoxy resin or an emulsified liquid solution of a major proportion by weight of an epoxy resin and a minor proportion by weight of a solvent therefor;
   (b) 3-methacryloxypropyltrimethoxysilane and 3-aminopropyltriethoxysilane or hydrolysates thereof;
   (c) at least one glass fiber lubricant;
   (d) a thickening agent; and
   (e) surfactants.

2. A bundle of fibers according to claim 1 wherein the epoxy resin is a predominantly diglycidoxy-terminated linear condensation reaction product of a bisphenol and an epihalohydrin and wherein ingredient (a) is said emulsified liquid solution of a major proportion by weight of a epoxy resin in a minor proportion by weight of a solvent therefor.

3. A bundle of fibers according to claim 2 wherein said bisphenol comprises bisphenol A.

4. A bundle of fibers according to claim 3 wherein the average epoxy equivalent weight of said epoxy resin is about 250 to about 400.

5. A bundle of fibers according to claim 4 wherein said epoxy resin emulsified in said dilute aqueous sizing composition is a solution containing about 80 to about 95 percent by weight of said epoxy resin and about 20 to about 5 percent by weight of diacetone alcohol.

6. A composite article comprising bundles of glass fibers according to claim 1 embedded in a matrix comprising cured unsaturated polyester, vinylester or epoxy resin.

7. A composite article comprising bundles of glass fibers according to claim 3 embedded in a matrix comprising cured unsaturated polyester, vinylester or epoxy resin.

8. A bundle of high-strength magnesium aluminosilicate glass fibers having a size coating thereon consisting of the dried residue of dilute aqueous sizing composition consisting essentially of, in approximate weight percent;
   (a) 5.0% of a surfactant containing emulsified liquid solution of an epoxy resin comprising the condensation reaction product of bisphenol A and epichlorohydrin and having an epoxy equivalent weight of from about 250 to about 400;
   (b) 1.5% 3-methacryloxypropyltrimethoxysilane and 0.6% 3-aminopropyltriethoxysilane or hydrolysates thereof;
   (c) 0.3% of a mixture containing about 40% mineral oil, about 20% amide/ester lubricant/anti-static agent and about 20% surfactant; and
   (d) 0.4% polyvinylpyrrolidone
   wherein said liquid solution of said epoxy resin is a solution containing about 80 to about 95 percent by weight of said epoxy resin in diacetone alcohol.

9. A composite article comprising bundles of glass fibers, according to claim 8, embedded in a matrix comprising cured unsaturated polyester, vinylester or epoxy resin.

10. The bundle of claim 1 wherein said aqueous sizing composition is acidic.

11. The bundle of glass fibers of claim 1 wherein the epoxy equivalent weight of said epoxy resin is between 250–400, wherein said thickening agent is polyvinylpyrrolidone and wherein said at least one glass fiber lubricant comprises mineral oil.

12. The bundle of glass fibers of claim 11 wherein said lubricant is a mixture of said mineral oil and an amide/ester lubricant/anti-static agent.

13. A bundle of high strength magnesium aluminosilicate glass fibers wherein the component fibers have a size coating thereon which is the dried residue of a dilute aqueous sizing composition consisting essentially of the composition formed by combining a surfactant containing emulsified liquid solution of an epoxy resin comprising the condensation reaction product of bisphenol A and epichlorohydrin and having an epoxy equivalent weight of from 250–400, and 3-methacryloxypropyltrimethoxysilane, and 3-aminopropyltriethoxysilane, or hydrolysates, a mixture containing about 40% mineral oil, about 20% amide/ester lubricant/anti-static agent, about 20% surfactants and polyvinylpyrolidone.

14. A bundle of fibers according to claim 1, wherein said at least one glass fiber lubricant is an emulsified mineral oil.

* * * * *